US012683071B2

(12) United States Patent
Heo et al.

(10) Patent No.: US 12,683,071 B2
(45) Date of Patent: Jul. 14, 2026

(54) NOISE/VIBRATION REDUCTION DEVICE FOR TRANSFORMERS

(71) Applicant: HYOSUNG HEAVY INDUSTRIES CORPORATION, Seoul (KR)

(72) Inventors: Woo Heng Heo, Changwon-si (KR); Jee Woo Ryu, Gimhae-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 817 days.

(21) Appl. No.: 18/002,096

(22) PCT Filed: Nov. 22, 2021

(86) PCT No.: PCT/KR2021/017137
§ 371 (c)(1),
(2) Date: Dec. 16, 2022

(87) PCT Pub. No.: WO2022/186448
PCT Pub. Date: Sep. 9, 2022

(65) Prior Publication Data
US 2023/0230763 A1 Jul. 20, 2023

(30) Foreign Application Priority Data
Mar. 3, 2021 (KR) ........................ 10-2021-0027994

(51) Int. Cl.
*H01F 27/33* (2006.01)
*H01F 27/02* (2006.01)

(52) U.S. Cl.
CPC ............. *H01F 27/33* (2013.01); *H01F 27/02* (2013.01)

(58) Field of Classification Search
CPC ........... H01F 27/33; H01F 27/02; H05K 5/00; H05K 5/0056
USPC ............................................................ 174/50
See application file for complete search history.

(56) References Cited

U.S. PATENT DOCUMENTS 4,558,296 A 12/1985 Thoren

FOREIGN PATENT DOCUMENTS

| | | | |
|---|---|---|---|
| CN | 105609264 | A | 5/2016 |
| JP | 2010212350 | A | 9/2010 |
| JP | 2012123293 | A | 6/2012 |
| KR | 20-0182678 | Y1 | 5/2000 |
| KR | 10-0966648 | B1 | 6/2010 |
| KR | 10-2011-0055669 | A | 5/2011 |
| KR | 20-0475470 | Y1 | 12/2014 |
| KR | 10-2016-0026099 | A | 3/2016 |
| KR | 101785969 | B1 | 10/2017 |

(Continued)

*Primary Examiner* — Tremesha W Burns
(74) *Attorney, Agent, or Firm* — NKL Law; Jae Youn Kim

(57) ABSTRACT

A noise/vibration reduction device for transformers mounts on an inner surface of a tank side wall of a transformer tank having an internal space, the tank side wall defining an exterior of the tank. The device includes multiple through hole plates on the tank side wall and multiple support members located between adjacent plates and between one plate and the tank side wall. The support members separate the plates to define spaces including a first space between a first and second plate, a second space between the second and third plate, and a third space between the third plate and the tank side wall. The plates include first, second, and third through hole plates having corresponding through holes with different specifications, including different hole diameters, hole lengths, and distances between adjacent holes for different noise frequencies.

6 Claims, 6 Drawing Sheets

(56) References Cited

FOREIGN PATENT DOCUMENTS

| | | | |
|---|---|---|---|
| KR | 10-2020-0143556 | A | 12/2020 |
| KR | 20200143556 | A | 12/2020 |

NOISE/VIBRATION REDUCTION DEVICE FOR TRANSFORMERS

TECHNICAL FIELD

The present disclosure relates to a noise/vibration reduction device for transformers.

BACKGROUND ART

FIG. 1 shows an external configuration of a general transformer. The external appearance of a transformer 1 may be formed by a tank 3. The inner part of the tank 3 contains main components such as a core constituting the transformer 1, and the inside of the tank 3 is filled with insulating oil. The outer surface of the tank 3 is provided with a brace 6 in the pattern of a grid.

In such a transformer 1, vibration and noise may be generated during its operation. One of these noises is generated by the 120 Hz basic frequency and harmonic components generated by the inner core, and is transmitted to the wall of tank 3 by the structure supporting the core and insulating oil, which is an incompressible fluid. The noise transmitted to the wall of the tank 3 may cause local resonance on the surface of the tank 3, such a resonance having a problem of amplifying the noise more.

Accordingly, in the prior arts, in order to remove the resonance occurring locally on the surface of the tank 3, a trial mass 7 is attached to a specific position of the tank 3 as shown in FIG. 1. That is, by using the trial mass 7, the mass and rigidity of the specific position of the tank 3 are changed to avoid resonance.

However, the trial mass 7 is required to vary in dimension according to the natural frequency of vibrations generated in the tank 3. Therefore, the trial mass 7 needs to be made in various dimensions and many types of molds are also required. This is because, in order to change the natural frequency value of the trial mass 7 to prevent resonance, the size of the rubber-made hexahedron and the dimensions of the metal plates on both sides of the rubber-made hexahedron must be different.

In addition, the noise and vibration generated by the transformer 1 are mainly transmitted to the tank by insulating oil, and may have a frequency of n times the frequency of a power supplied in general. For example, when a power source of 60 Hz is used, noise and vibration having frequencies of 120 Hz, 240 Hz, and 360 Hz may occur.

In addition, once vibration and noise are transmitted to the tank 3, the durability of the tank 3 itself is deteriorated. Therefore, it is very necessary to prevent these noises and vibrations from being transmitted to the tank 3.

As examples of such prior art, there are Korean Patent No. 20-0182678 and Korean Patent No. 20-0475470.

DISCLOSURE

Technical Problem

An object of the present disclosure to satisfy the above-described needs is to reduce noise and vibration of various frequencies generated in a transformer.

Another object of the present disclosure is to minimize the transfer of noise and vibration from the inside of a tank of the transformer to the outside.

Technical Solution

According to features of the present disclosure for achieving the above objects, the present disclosure is a noise/vibration reduction device used in a transformer where a tank having an internal space constitutes an exterior, comprising: a plurality of through hole plates installed on the tank side walls constituting the side of the tank and having through holes formed therein; and, a plurality of support members positioned between the through hole plates and between the through hole plate and the tank side wall, to form a space between the through hole plates and between the through hole plate and the tank side wall. The plurality of through hole plates may have different dimensions of the through holes to reduce noise having different frequencies, respectively.

The through hole formed in the through hole plate may have different reduced frequencies by varying a diameter, length, and distance between the through holes.

The through hole plate and the support member may be made of an insulating material.

The through hole plate and the support member may be a press board manufactured by overlapping, drying, and pressing thin wet sheet made from plant fiber as a raw material.

The through hole plate may include a first through hole plate having a first through hole, a second through hole plate having a second through hole, and a third through hole plate having a third through hole.

A plurality of first support members may be positioned between the first through hole plate and the second through hole plate to form a first space, a plurality of second support members may be positioned between the second through hole plate and the third through hole plate to form a second space, and a plurality of support members may be positioned between the third through hole plate and the tank sidewall to form a third space.

The through hole may be formed through the first to third through hole plates and the first to third support members, a stud bolt installed on the tank sidewall may penetrate the through hole, and a disk nut may be fastened to the stud bolt so that a contact disk is in close contact with the front surface of the first through hole plate.

The disk nut may be made of an insulating material.

Advantageous Effects

A noise/vibration reduction device for a transformer according to the present disclosure may have at least one or more of the following effects.

In the present disclosure, noise of various frequencies may be eliminated by using a plurality of through hole plates having through holes, and by varying the number of the through holes, size of the through holes, distance between the through holes, and thickness of the through hole plates, etc.

In addition, in the present disclosure, as an insulating oil passes through the through holes formed in the through hole plate while generating a damping action, vibration may be greatly reduced by the insulating oil passing through the plurality of through hole plates.

Furthermore, in the present disclosure, the plurality of through hole plates that reduce vibration and noise may be positioned inside the tank of the transformer, such that the noise/vibration reduction device may not be exposed to the external environment, and space around the tank constituting the exterior of the transformer may be efficiently utilized.

Also, in the present disclosure, since the vibration generated by a magnetic distortion is attenuated before being transmitted to the tank, damage caused by the transfer of the vibration to the tank may be minimized.

MODE FOR DISCLOSURE

Figure 1:
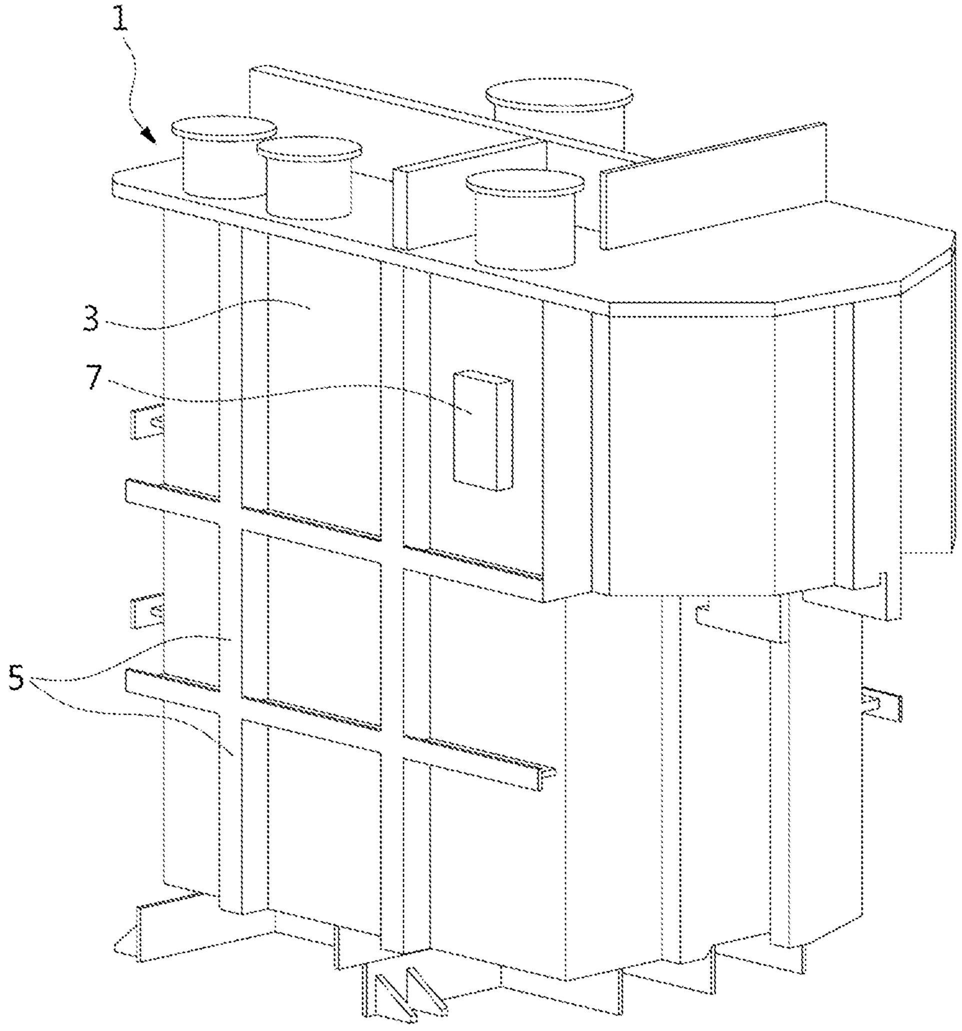
FIG. 1 is a perspective view showing an appearance of a transformer according to the prior art.

Hereinafter, some embodiments of the present disclosure will be described in detail with reference to exemplary drawings. In assigning reference numerals to the components of each drawing, it should be noted that the same components are given the same reference numerals as much as possible even though the same components are indicated on different drawings. In addition, in describing the embodiment of the present disclosure, if it is determined that a detailed description of a related known configuration or function interferes with the understanding of the embodiment of the present disclosure, the detailed description thereof will be omitted.

In addition, in describing the components of the embodiment of the present disclosure, terms such as first, second, A, B, (a), (b), etc. may be used. These terms are only used to distinguish between the components, and the nature, or order of the components are not limited by the terms. When a component is described as being “combined with”, “coupled to” or “connected to” another component, the component may be directly connected to or combined with each other, but it should be understood that another component may be “connected to”, “coupled to” or “combined with” each of the components therebetween.

Figure 2:
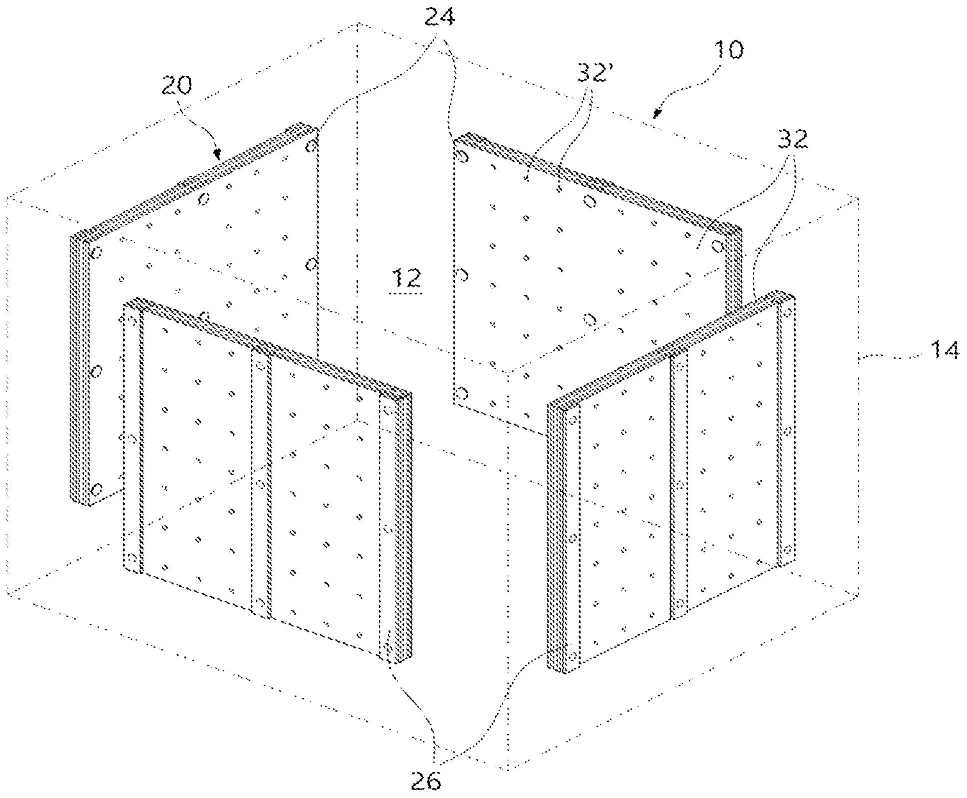
FIG. 2 is a perspective view schematically showing the configuration of a preferred embodiment of a noise/vibration reduction device for transformers according to an embodiment of the present disclosure.

As shown in the drawings, a noise/vibration reduction device 20 of an embodiment may be installed in an inner space 12 of a tank 10 that may constitute the exterior of a transformer. The noise/vibration reduction device 20 may be installed on an inner surface of a tank side wall 14 forming the inner surface of the inner space 12 of the tank 10. For example, the reduction device 20 may be installed on each of the inner surfaces of a hexahedral inner space 12. In this embodiment, as shown in FIG. 2, the reduction device 20 may be installed on each of the four inner surfaces of the inner space 12.

In general, the inner space 12 of the tank 10 has a hexahedral shape and an inner surface of the inner space 12, which is an inner surface of the tank side wall 14, may have a rectangular shape. Of course, when another configuration is located on a tank side wall 14, the inner surface area of the tank side wall 14 on which the reduction device 20 is installed may not have a rectangular shape. In the drawings of the embodiment, for convenience, the reduction device 20 is rectangular when viewed from the front, and is located on the entire inner surface of the inner space 12.

The reduction device 20 may be fixed to the inner surfaces of the tank side walls 14 by stud bolts 22 and disk nuts 24. A plurality of the stud bolts 22 are fixed to the tank side wall 14, and may penetrate a plurality of through holes 20' formed in the reduction device 20. The disk nut 24 may be seated on the front surface of the reduction device 20 to fix the reduction device 20, while being fastened to the stud bolt 22 positioned in the through hole 20'.

The disk nut 24 may include a fastening body 25 and a contact disk 25'. The fastening body 25 is a portion fastened to the stud bolt 22 and may have a substantially cylindrical shape. The contact disk 25' has a disk shape and protrudes from one end of the fastening body 25 in a centrifugal direction. The contact disk 25' may be mounted to be in close contact with the front surface of the reduction device 20 at a position corresponding to the inlet edge portion of the through hole 20'. The fastening body 25 may have the stud bolt 22 positioned so as to penetrate the center thereof, and a screw part fastened to the screw part of the stud bolt 22 may be provided on the inner surface thereof. The contact disk 25' may have a substantially disk shape.

Figure 3:
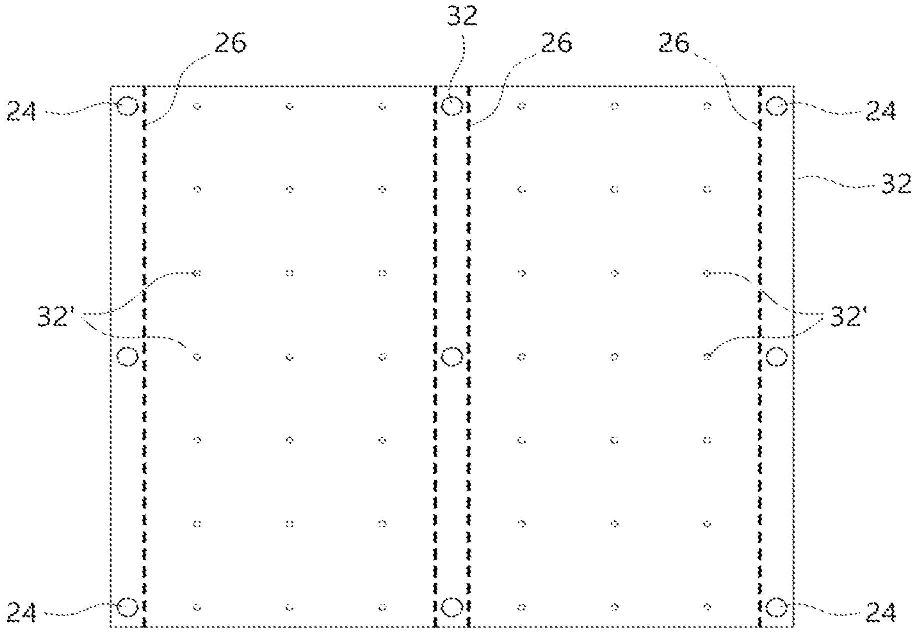
FIG. 3 is a front view of the configuration of an important part of the embodiment of the present disclosure.
Figure 4:
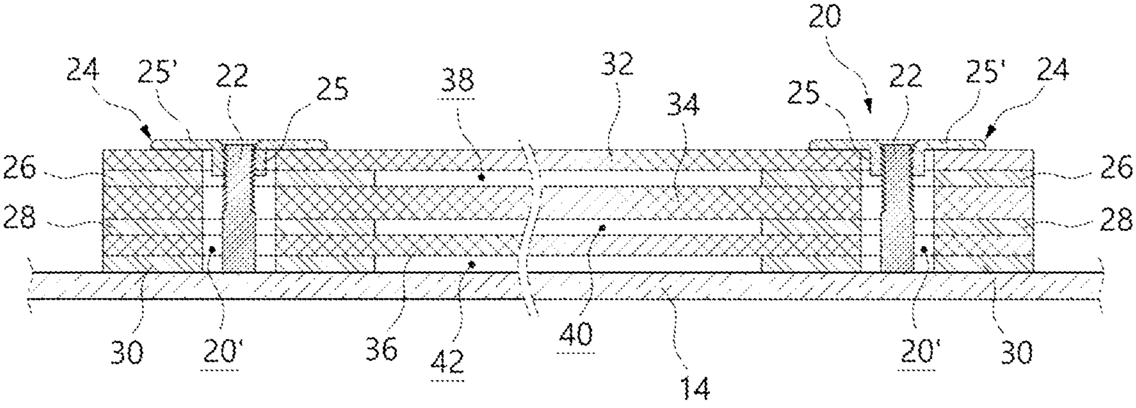
FIG. 4 is a cross-sectional view showing an important part of the embodiment of the present disclosure.
Figure 5:
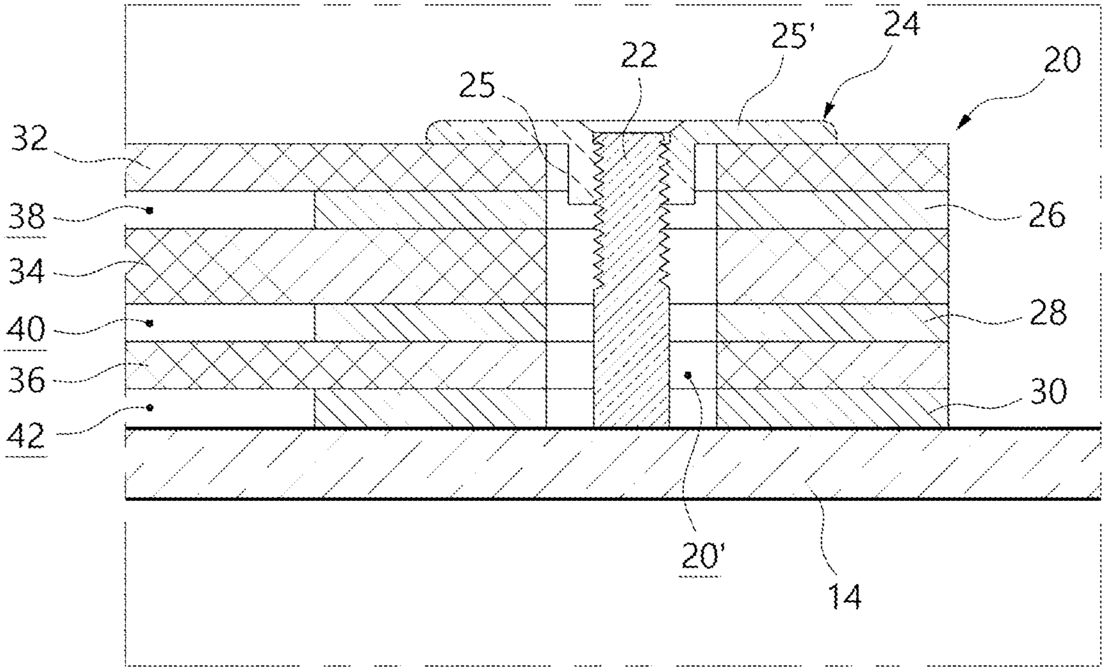
FIG. 5 is an enlarged view of part A of FIG. 4.

There may be a plurality of pairs of the stud bolts 22 and the disk nut 24. In the illustrated embodiment, as shown in FIG. 3, there may be six pairs of stud bolts 22 and disc nuts 24 in the reduction device 20 installed on the tank side wall 14 on one side. The thickness of the contact disk 25' of the disk nut 24 is thinner than that of a first through hole plate 32 to be described below, such that the protrusion of the contact disk 25' from the first through hole plate 32 may be minimized. Alternatively, a predetermined groove may be formed in the first through hole plate 32 to prevent the contact disk 25' from protruding from the surface of the first through hole plate 32. The disk nut 24 may be made of an insulating material.

The reduction device 20 may include a plurality of support members 26, 28, 30 and a plurality of through hole plates 32, 34, 36. The plurality of support members 26, 28, and 30 may form first to third spaces 38, 40, and 42 between the plurality of through hole plates 32, 34 and 36, respectively.

For convenience, when the inner surface of the tank side wall 14 is viewed from the center of the inner space 12, the visible through hole plate 32 is referred to as the first through hole plate 32. The second through hole plate 34 is positioned to face the first through hole plate 32, and the first support member 26 may be positioned between the first through hole plate 32 and the second through hole plate 34 to form the first space 38. The first support member 26 may form a predetermined space, that is, the first space 38 between the first through hole plate 32 and the second through hole plate 34, and may combine between the first through hole plate 32 and the second through hole plate 34. In addition, a plurality of the first support members 26 may be installed side by side to extend in the vertical direction between the first through hole plate 32 and the second through hole plate 34. Alternatively, a plurality of the first support members 26 may be installed side by side to extend in the left and right directions between the first through hole plate 32 and the second through hole plate 34. In the illustrated embodiment, the three first support members 26 are arranged side by side at a predetermined interval in the vertical direction.

The third through hole plate 36 is positioned to face the second through hole plate 34, and the second support member 28 may be positioned between the second through hole plate 34 and the third through hole plate 36 to form the second space 40. The second support member 28 may form a predetermined space, that is, the second space 40, between the second through hole plate 34 and the third through hole plate 36, and may combine between the second through hole plate 34 and the third through hole plate 36.

The third support member 30 may be positioned between the third through hole plate 36 and the inner surface of the tank side wall 14 to form the third space 42. The third space 42 may be formed between the third through hole plate 36 and the inner surface of the tank side wall 14.

A plurality of through holes 32', 34', 36' are formed in the first to third through hole plates 32, 34, and 36, respectively. The plurality of first through holes 32' may be formed in the first through hole plate 32. The plurality of second through holes 34' may be formed in the second through hole plate 34. The plurality of third through holes 36' may be formed in the third through hole plate 36.

The inner diameter D, the length T of the through holes 32', 34', and 36', (differently, the thickness of the through hole plates 32, 34, and 36) and the distance L between the through holes 32', 34', and 36' may be different from each other in the first to third through hole plates 32, 34, and 36. Of course, at least some of these values D, T, and L may be the same.

The first to third through hole plates 32, 34, and 36 may serve to resonate and reduce noise and vibration having different frequencies, respectively. For example, if a 60 Hz power source is used in a transformer, the frequencies of noise and vibration may have integer multiples such as 120 Hz, 240 Hz, and 360 Hz. If a 50 Hz power supply is used in a transformer, the frequency of noise and vibration may have an integer multiple of 100 Hz, 200 Hz, or 300 Hz.

Figure 6:
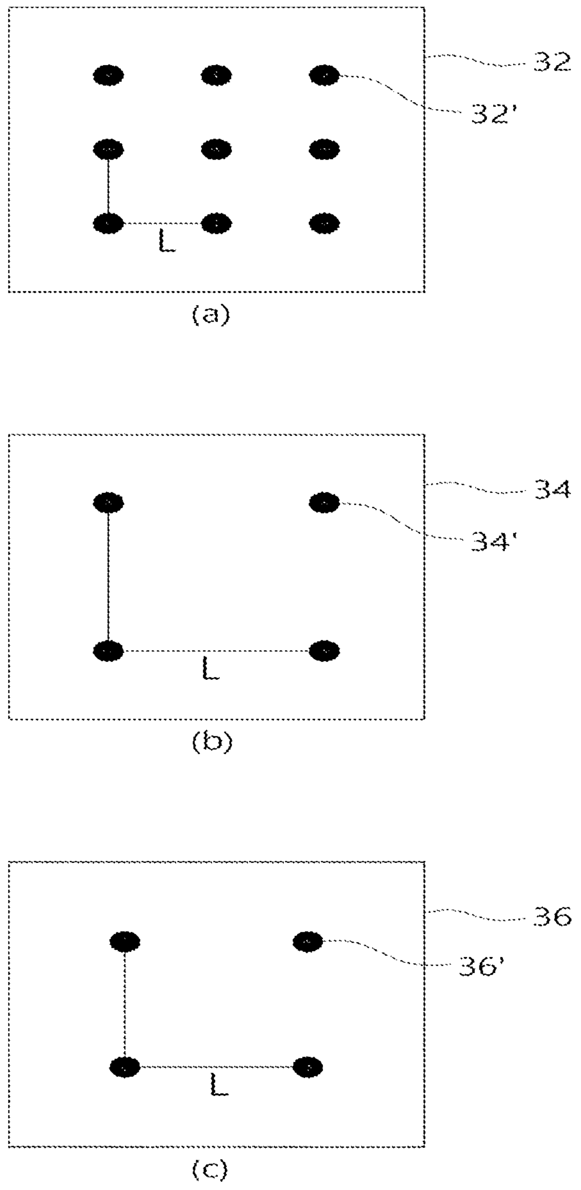
FIG. 6 is a front view showing a portion of through hole plates constituting the embodiment of the present disclosure.
Figure 7:
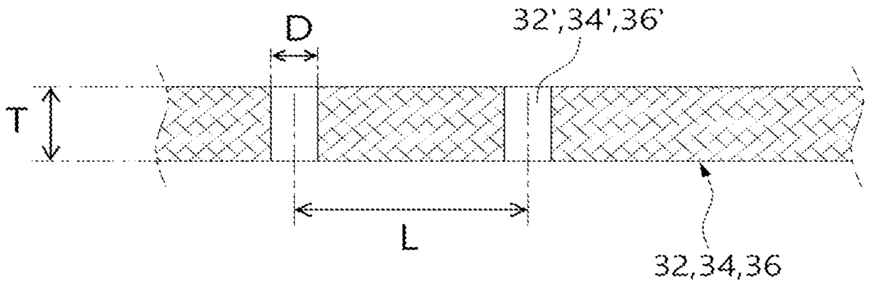
FIG. 7 is a cross-sectional view showing a configuration of a through hole formed in the through hole plate constituting the embodiment of the present disclosure.

For example, the first through hole plate 32 may reduce noise and vibration having a frequency of 360 Hz, the second through hole plate 34 at 120 Hz, and the third through hole plate 36 at 240 Hz. To this end, the inner diameter(D) and the length(T) of the first through hole 32' formed in the first through hole plate 32, the second through hole 34' formed in the second through hole plate 34, and the third through hole 36' formed in the third through hole plate 36, and the distance(L) between the respective through holes 32',34', 36' may set according to a corresponding frequency value. In FIG. 6, such a state is partially reflected.

Meanwhile, the volumes of the first space 38, the second space 40, and the third space 42 may be different or the same according to design conditions. In the present embodiment, the first to third spaces 38, 40, and 42 may have the same volume. For reference, a frequency value of the noise to be removed and the inner diameter (D) may be proportional, and the length (T) and the distance (L) or the volumes of the spaces 38, 40, 42 may be inversely proportional. Accordingly, the frequency of noise and vibration that may be removed by the first to third through hole plates 32, 34, and 36 may be set by setting the above various variables differently.

All of the first to third through hole plates 32, 34, and 36 and the first to third support members 26, 28, and 30 may be made of an insulating material. For example, a so-called press board may be used. The press board refers to a board manufactured by overlapping, drying, and pressing thin wet sheet made from plant fiber as a raw material.

Hereinafter, it will be described in detail that the noise/vibration reduction device for transformer according to the present disclosure having the above-described configuration is used.

First, it will be described that the reduction device 20 of the present embodiment is installed on the inner surface of the tank sidewall 14. A plurality of stud bolts 22 fixed to the tank sidewall 14 are to be positioned in the through hole 20' formed by penetrating the first to third through hole plates 32, 34, 36 and the first to third support members 26, 28, 30. Each disk nuts 24 is fastened to the stud bolt 22 respectively, for the contact disk 25' of the disk nut 24 to be in close contact with the front surface of the first through hole plate 32, such that the first to third through hole plates 32, 34, 36 and the first to third support members 26, 28, 30 are fixed to the tank side wall 14.

A coil is wound around an iron core in the center of the tank 10 of the transformer, and power having a frequency of, for example, 60 Hz is supplied to the coil to operate the transformer. As the transformer operates, a magnetic distortion may occur in the iron core. Mechanical vibration is generated in the iron core due to the magnetic distortion, and this mechanical vibration may be transmitted to the side wall 14 of the tank 10 by insulating oil.

The reduction device 20 of the present disclosure is to reduce noise and vibration transmitted through the insulating oil. As the insulating oil passes through the first to third through hole plates 32, 34, 36, noise may be reduced due to resonance. And the vibration may be reduced due to damping generated while the insulating oil passes through the through hole 32',34', and 36'.

For example, a noise having the frequency of 360 Hz may be reduced by causing resonance while passing through the first through hole 32', and a noise having the frequency of 120 Hz may be reduced by causing resonance through the second through hole 34'. As well, a noise having the frequency of 240 Hz may be reduced by causing resonance while passing through the third through hole 36'.

In addition, as the insulating oil flows sequentially into the first through hole 32', the first space 38, the second through hole 34', the second space 40, the third through hole 36', and the third space 42, damping action may occur and vibration may be attenuated.

Therefore, the vibration generated by the magnetic distortion may be prevented from being transmitted to the tank sidewall 14, and noise having a specific frequency may be removed by the resonance phenomenon.

Even though it has been described that all components constituting the embodiments of the present disclosure are combined into one or operated in combination with each other, the present disclosure is not necessarily limited to the embodiments. That is, within the scope of the objective of the present disclosure, all of the components may be selectively combined into at least one and operated. In addition, the terms such as "include", "consist of", or "have" described above mean that the corresponding component may be present unless otherwise stated, and thus should be construed that the terms do not exclude other components, but may further include other components. All terms, including technical or scientific terms, have the same meaning as commonly understood by those skilled in the art to which the present disclosure belongs, unless defined otherwise. Generally used terms, such as terms defined in the dictionary, should be interpreted as being consistent with the contextual meaning of the related art, and should not be interpreted in an ideal or excessively formal meaning unless explicitly defined in the present disclosure.

The above description is merely illustrative of the technical idea of the present disclosure, and those skilled in the art to which the present disclosure belongs may perform various modification and changes within the scope not departing from the essential characteristics of the present disclosure. Accordingly, the embodiments disclosed in the present disclosure are not intended to limit, but to explain the technical idea of the present disclosure, and the scope of the technical spirit of the present disclosure is not limited by these embodiments. The scope of protection of the present disclosure should be interpreted by the claims below, and all technical spirits within the scope equivalent to the scope of the claims should be interpreted as being included in the scope of the claims of the present disclosure.

The invention claimed is:

1. A noise/vibration reduction device used in a transformer including a tank having an internal space and a tank side wall defining an exterior of the tank, comprising: a plurality of through hole plates installed on the tank side wall, each of the plurality of through hole plates having at least one through hole disposed therein; and a plurality of support members positioned between adjacent ones of the plurality of through hole plates and between one of the plurality of through hole plates and the tank side wall to define a plurality of spaces including a first space, a second space and a third space between the adjacent ones of the plurality of through hole plates and between the one of the plurality of through hole plates and the tank side wall, wherein each of the plurality of through hole plates has different specifications of the through holes disposed therein to reduce noises having different frequencies, wherein the plurality of through hole plates include a first through hole plate having at least one first through hole disposed therein, a second through hole plate having at least one second through hole disposed therein, and a third through hole plate having at least one third through hole disposed therein, and wherein a plurality of first support members are positioned between the first through hole plate and the second through hole plate to define the first space, a plurality of second support members are positioned between the second through hole plate and the third through hole plate to define the second space, and a plurality of third support members are positioned between the third through hole plate and the tank side wall to define the third space.

2. The noise/vibration reduction device of claim 1, wherein the at least one through hole disposed in each of the plurality of through hole plates have different diameters, lengths, and distances between adjacent through holes, thereby varying the frequency reduced.

3. The noise/vibration reduction device of claim 1, wherein the plurality of through hole plates and the plurality of support members are made of an insulating material.

4. The noise/vibration reduction device of claim 3, wherein the through hole plates and the support members are press boards manufactured by overlapping, drying, and pressing a thin wet sheet made from plant fiber as a raw material.

5. The noise/vibration reduction device of claim 1, wherein a through hole is formed by penetrating the first to third through hole plates and the first to third support members, wherein a stud bolt installed on the tank side wall penetrates the through hole, and a disk nut is fastened to the stud bolt so that a contact disk is in contact with the front surface of the first through hole plate.

6. The noise/vibration reduction device of claim 5, wherein the disk nut is made of an insulating material.

* * * * *